(12) United States Patent
Ishikawa et al.

(10) Patent No.: US 11,280,910 B2
(45) Date of Patent: Mar. 22, 2022

(54) SATELLITE RADIO WAVE SENSITIVITY DISTRIBUTION MANAGEMENT SYSTEM AND METHOD FOR WORK VEHICLE

(71) Applicant: KUBOTA CORPORATION, Osaka (JP)

(72) Inventors: Naohiro Ishikawa, Hyogo (JP); Akisato Hori, Hyogo (JP); Akira Chabata, Hyogo (JP); Yasushi Watabe, Hyogo (JP)

(73) Assignee: KUBOTA CORPORATION, Osaka (JP)

( * ) Notice: Subject to any disclaimer, the term of this patent is extended or adjusted under 35 U.S.C. 154(b) by 420 days.

(21) Appl. No.: 16/484,196

(22) PCT Filed: Dec. 20, 2017

(86) PCT No.: PCT/JP2017/045822
§ 371 (c)(1),
(2) Date: Aug. 7, 2019

(87) PCT Pub. No.: WO2018/146955
PCT Pub. Date: Aug. 16, 2018

(65) Prior Publication Data
US 2019/0369260 A1    Dec. 5, 2019

(30) Foreign Application Priority Data
Feb. 13, 2017  (JP) .............................. JP2017-024131

(51) Int. Cl.
*G01S 19/05*   (2010.01)
*G01C 21/34*   (2006.01)
(Continued)

(52) U.S. Cl.
CPC .......... *G01S 19/05* (2013.01); *G01C 21/3415* (2013.01); *G01C 21/3461* (2013.01);
(Continued)

(58) Field of Classification Search
CPC ..... G01S 19/05; G01S 19/14; G01C 21/3415; G05D 1/0088
(Continued)

(56) References Cited

U.S. PATENT DOCUMENTS

2013/0285849 A1   10/2013  Ben-Moshe et al.
2014/0070991 A1   3/2014  Liu et al.
(Continued)

FOREIGN PATENT DOCUMENTS

EP    2148447     1/2010
JP    09-062353   3/1997
(Continued)

OTHER PUBLICATIONS

Official Communication issued in Patent Application No. PCT/JP2017/045822, dated Apr. 3, 2018.
(Continued)

*Primary Examiner* — Harry K Liu
(74) *Attorney, Agent, or Firm* — Greenblum & Bernstein, P.L.C.

(57) ABSTRACT

A satellite radio wave sensitivity distribution management system for a work vehicle that travels automatically in a work site by satellite navigation technology includes a satellite positioning module that outputs satellite position data and reception sensitivity based on satellite information from a satellite, a sensitivity reduction event detection section that detects occurrence of a sensitivity reduction event, a sensitivity reduction event information generation section that generates sensitivity reduction event information including an occurrence location of the sensitivity reduction event, an occurrence time of the sensitivity reduction event, and satellite identification data, a sensitivity reduction event information storage section, a reception obstacle determination section that determines a reception
(Continued)

obstacle as the cause of the sensitivity reduction event, and a sensitivity reduction management section that manages a sensitivity reduction area and a sensitivity reduction time zone.

11 Claims, 4 Drawing Sheets

(51) Int. Cl.
    *G01S 19/14* (2010.01)
    *G01S 19/23* (2010.01)
    *G01S 19/24* (2010.01)
    *G05D 1/00* (2006.01)

(52) U.S. Cl.
    CPC ............ *G01S 19/14* (2013.01); *G01S 19/235* (2013.01); *G01S 19/24* (2013.01); *G05D 1/0088* (2013.01); *G05D 2201/0201* (2013.01)

(58) Field of Classification Search
    USPC .................................................. 342/357.42
    See application file for complete search history.

(56) References Cited

U.S. PATENT DOCUMENTS

| | | |
|---|---|---|
| 2016/0341830 A1 | 11/2016 | Dougan |
| 2018/0215393 A1 | 8/2018 | Miyakubo et al. |
| 2018/0329070 A1 | 11/2018 | Dougan |

FOREIGN PATENT DOCUMENTS

| | | |
|---|---|---|
| JP | 2009-245001 | 10/2009 |
| JP | 2012-159347 | 8/2012 |
| JP | 2013-238805 A | 11/2013 |
| JP | 2015-531479 | 11/2015 |
| WO | 2008/139607 | 11/2008 |
| WO | 2012/085876 | 6/2012 |
| WO | 2015/147111 | 10/2015 |
| WO | 2016/187419 A1 | 11/2016 |
| WO | 2016/192776 | 12/2016 |

OTHER PUBLICATIONS

Office Action issued in the Japanese Patent Application No. 2017-024131 dated Dec. 22, 2020 and along with English Translation thereof.

Extended European Search Report issued in the European Patent Application No. 17896300.5 dated Nov. 18, 2020.

SATELLITE RADIO WAVE SENSITIVITY DISTRIBUTION MANAGEMENT SYSTEM AND METHOD FOR WORK VEHICLE

TECHNICAL FIELD

This invention relates to a satellite radio wave sensitivity distribution management system and method for a work vehicle that travels automatically in a work site by the satellite navigation technology.

BACKGROUND ART

With a work vehicle that travels automatically in a work site by the satellite navigation technology using e.g. GNSS positioning system, its traveling along a set traveling route becomes impossible in the event of shortage occurring in sensitivity of radio waves transmitted from a satellite. In the case of a work vehicle, there is high possibility of presence of a mountain, a windbreak forest, etc. in the periphery of the work site, so there arises a problem of accurate automatic traveling via the satellite navigation becoming difficult due to shortage in the reception sensitivity at a certain area in the work site at a certain time zone.

A work vehicle according to Patent Document 1 includes a position calculating means for determining a position of a work vehicle with using a satellite positioning system, an automatic traveling means for causing the work vehicle to travel automatically, and a control device. An autonomous traveling of the vehicle is effected along a set traveling route stored in a storage device of the control device. Further, a controlling means provides a function of causing the storage device to store a position, a time and an area of occurrence of a positioning disturbance when positioning of the current position by the satellite positioning system has become impossible and a further function of causing a displaying means to display the occurrence of the positioning failure. With this, the position and the time of occurrence of the positioning failure will be kept as a history. And, such history information can be utilized as a reference when a measure is to be formulated in order to resolve the problem of disability of traveling due to radio wave disturbance.

BACKGROUND ART DOCUMENT

Patent Document

Patent Document 1: International Patent Publication No. 2015/147111

SUMMARY OF THE INVENTION

Problem to be Solved by Invention

However, in Patent Document 1, only the position and the time of occurrence of radio wave disturbance are stored, so even if a traveling route which can avoid such position and time of radio wave disturbance is generated for a next work, if the cause of the disturbance was blocking of radio wave by a mountain forest, a building, etc., even with avoidance of the time and position of the radio wave sensitivity reduction, depending on the time, radio wave sensitivity reduction can occur at a different position. To solve this problem, it is necessary to determine the cause of the radio wave sensitivity reduction, with taking into consideration also the condition of the satellite and geographical situation at that time. Thus, there remains a need for management of radio wave sensitivity reduction area dependent on satellite positioning and geographical situation, with consideration to such satellite positioning and geographical situation that can be a cause of radio wave sensitivity reduction.

Solutions

According to the present invention, there is provided a satellite radio wave sensitivity distribution management system for a work vehicle that travels automatically in a work site by satellite navigation technology, the system comprising:
- a satellite positioning module that outputs satellite position data and reception sensitivity based on satellite information from a satellite;
- a sensitivity reduction event detection section that detects occurrence of a sensitivity reduction event comprising abnormal reduction of the reception sensitivity;
- a sensitivity reduction event information generation section that generates sensitivity reduction event information including an occurrence location of the sensitivity reduction event, an occurrence time of the sensitivity reduction event, and satellite identification data that identifies the satellite as the subject of the sensitivity reduction event;
- a sensitivity reduction event information storage section that stores the sensitivity reduction event information retrievably;
- a reception obstacle determination section that determines a reception obstacle as the cause of the sensitivity reduction event, based on the sensitivity reduction event information; and
- a sensitivity reduction management section that manages a sensitivity reduction area and a sensitivity reduction time zone in which occurrence of the sensitivity reduction event due to the reception obstacle is presumed.

With the above-described configuration, when a sensitivity reduction event comprising abnormal drop of reception sensitivity occurs, there is generated sensitivity reduction event information which includes not only location and time of occurrence of this sensitivity reduction event, but also satellite identification data that identifies a particular satellite as the subject of the sensitivity reduction event and this sensitivity reduction event information is stored in the sensitivity reduction event information storage section functioning as a "database". Then, from the satellite identification data, it is possible to obtain an elevation angle and an azimuth angle of the particular satellite which is involved in the reception sensitivity reduction, thus, it is possible to presume presence of a certain reception obstacle causing the reception sensitivity reduction between the occurrence location of the sensitivity reduction event and the particular satellite identified. In this, if reference is made to the contour of the occurrence location of the sensitivity reduction event and also distribution of trees or buildings, it will become also possible to identify a reception obstacle such as a' particular mountain forest, a building, etc. as the cause of sensitivity reduction event. Once the reception obstacle is determined, the position (sensitivity reduction area) and time zone (sensitivity reduction time zone) of the sensitivity reduction event caused by this reception obstacle and the satellite positioning will be presumed. With this, it becomes possible to manage a radio wave sensitivity reduction area by presuming change over time of the area where radio wave sensitivity reduction occurs depending on the satellite positioning and geographical situation.

According to one preferred embodiment of the present invention, there is provided a work site information generation section that generates work site information added with satellite radio wave sensitivity distribution, the work site information being comprised of the sensitivity reduction area and the sensitivity reduction time zone incorporated in a map of the work site. With this configuration, the work site information added with satellite radio wave sensitivity distribution is comprised of the sensitivity reduction area and the sensitivity reduction time zone incorporated in a map of the work site. Therefore, from this work site information added with satellite radio wave sensitivity distribution, a work site map with marking of the sensitivity reduction area can be generated for each time zone. And, with reference to such work site map, it is possible to produce a work plan for efficient working travel of the work vehicle even for such a work site in which sensitivity reduction areas dependent upon satellite positioning and/or geographical situation are scatteredly present.

If a work site map added with sensitivity reduction areas which differ for respective time zones is made available, this will make it possible to create a traveling route for avoiding such sensitivity reduction areas, with taking the time of passage into consideration. For this reason, according to one preferred embodiment of the present invention, there is provided a traveling route generation section that generates a traveling route for the work vehicle, the traveling route generation section being configured to generate the traveling route so as not to encounter the sensitivity reduction event, with consideration to the sensitivity reduction area and the sensitivity reduction time zone. With this, it is possible to generate a traveling route for efficient working travel of the work vehicle even for such a work site in which sensitivity reduction areas dependent upon time are scatteredly present.

Even with accurate grasping of the time zones and areas of sensitivity reduction, in an actual automatic traveling of the work vehicle, traveling along a traveling route according to a specified time schedule may become impossible due to various environmental factors or troubles in the work vehicle per se. As measures to cope with this, the present invention proposes two embodiments as follow.

According to one of them, the traveling route is added with the sensitivity reduction area and the sensitivity reduction time zone; and when possibility of the work vehicle entering the sensitivity reduction area in the sensitivity reduction time zone is confirmed, the work vehicle is caused to wait until exit from the sensitivity reduction time zone. With this arrangement, it is possible to avoid such inconvenience as interruption in hallway of a work due to stop of automatic traveling caused by sudden reception sensitivity reduction or stuck of the work vehicle at a location where stopping is undesirable.

According to the other of the inventive proposals, the traveling route is added with the sensitivity reduction area and the sensitivity reduction time zone; and there is provided a traveling route changing section configured to change the traveling route to a route for moving into a location of better reception sensitivity, when possibility of the work vehicle entering the sensitivity reduction area in the sensitivity reduction time zone is confirmed. With this arrangement, the work vehicle can avoid stop of its automatic traveling due to reception sensitivity reduction in the satellite radio wave and the work vehicle can automatically move to a location of better or good reception sensitivity to continue the work. As a result, waste of time due to traveling interruption can be decreased.

According to one preferred embodiment of the present invention:
the satellite positioning module, the sensitivity reduction event detection section and the sensitivity reduction event information generation section are provided in the work vehicle;
the sensitivity reduction event information storage section, the reception obstacle determination section and the sensitivity reduction management section are provided in a management computer remote from the work site; and
the sensitivity reduction event information is forwarded from the work vehicle to the management computer.

In the case of this embodiment, the work vehicle functions like a "probe car" for the sensitivity reduction event while effecting work traveling in a work site and transmits collected sensitivity reduction event information to the management computer. On the other hand, the management computer functions as a "cloud server" and accumulates sensitivity reduction event information from all work vehicles participating in this satellite radio wave sensitivity distribution management system. Further, the management computer can provide sensitivity reduction area and sensitivity reduction time zone based on a reception obstacle presumed from the sensitivity reduction event information, at any time on demand from the work vehicle side.

Further, according to the present invention, there is provided a satellite radio wave sensitivity distribution management method for a work vehicle that travels automatically in a work site by satellite navigation technology, the method comprising the steps of:
outputting satellite position data and reception sensitivity based on satellite information from a satellite;
detecting occurrence of a sensitivity reduction event comprising abnormal reduction of the reception sensitivity;
generating sensitivity reduction event information including an occurrence location of the sensitivity reduction event, an occurrence time of the sensitivity reduction event, and satellite identification data that identifies the satellite as the subject of the sensitivity reduction event;
storing the sensitivity reduction event information retrievably;
determining a reception obstacle as a cause of the sensitivity reduction event, based on the sensitivity reduction event information; and
managing a sensitivity reduction area and a sensitivity reduction time zone in which occurrence of the sensitivity reduction event due to the reception obstacle is presumed.

In the above-described method, preferably, the method further comprises a step of generating work site information added with satellite radio wave sensitivity distribution, the work site information being comprised of the sensitivity reduction area and the sensitivity reduction time zone incorporated in a map of the work site.

Further, in the above-described method, preferably, the method further comprises a step of generating a traveling route for the work vehicle, the traveling route being generated so as not to encounter the sensitivity reduction event, with consideration to the sensitivity reduction area and the sensitivity reduction time zone.

Still further, in the above-described method, preferably, the traveling route is added with the sensitivity reduction area and the sensitivity reduction time zone; and when possibility of the work vehicle entering the sensitivity reduction area in the sensitivity reduction time zone is confirmed, the work vehicle is caused to wait until exit from the sensitivity reduction time zone.

Still further, in the above-described method, preferably, the traveling route is added with the sensitivity reduction area and the sensitivity reduction time zone; and the method further comprises a step of changing the traveling route to a route for moving into a location of better reception sensitivity, when possibility of the work vehicle entering the sensitivity reduction area in the sensitivity reduction time zone is confirmed.

MODES OF EMBODYING THE INVENTION

Figure 1:
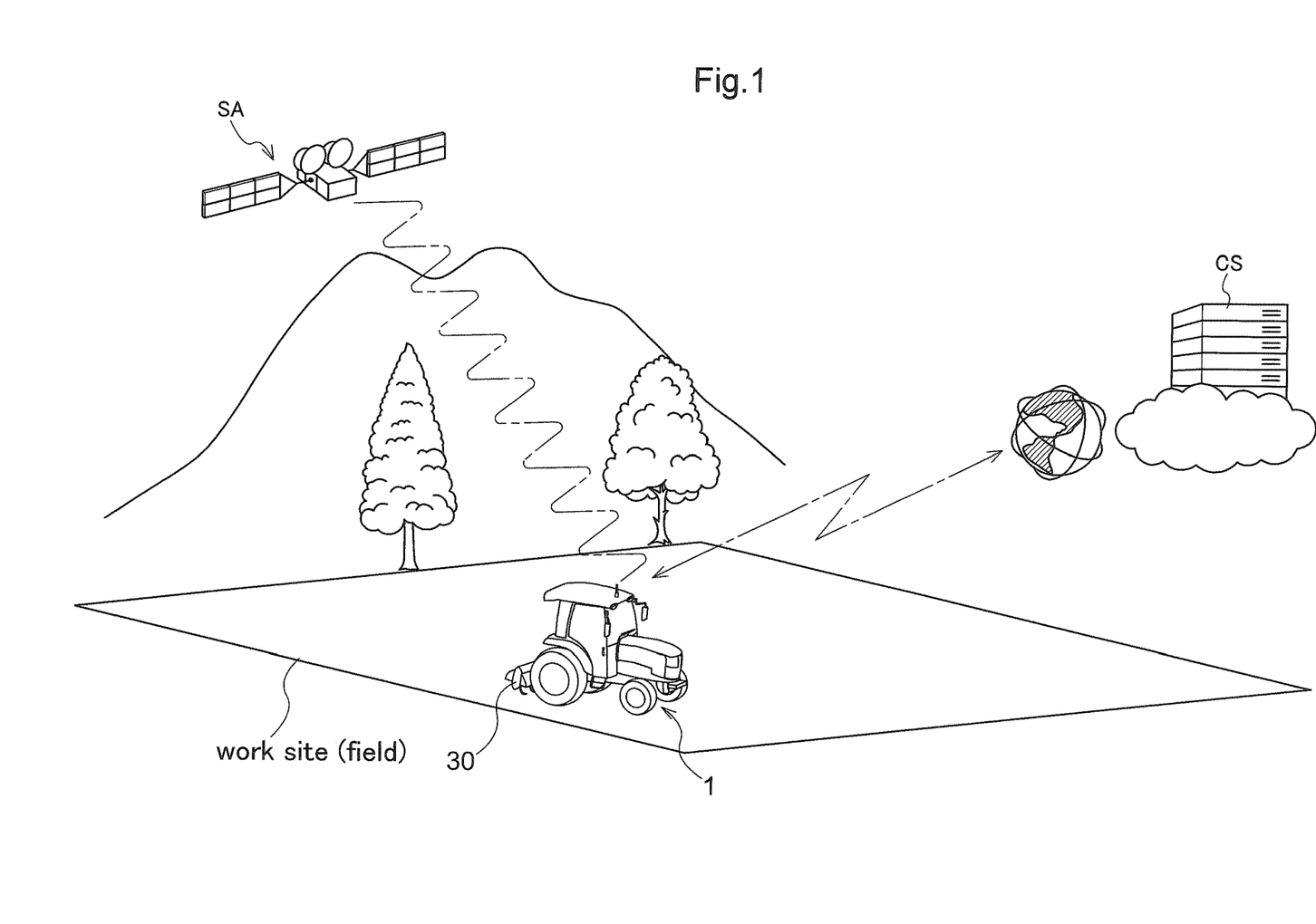
FIG. 1 is an explanatory view illustrating a situation of an automatic traveling of a work vehicle that implements a satellite radio wave sensitivity distribution management system according to the present invention.

Next, with reference to the drawings, there will be explained a satellite radio wave sensitivity distribution management system and method according to the present invention. FIG. 1 shows a work vehicle that travels automatically in a work site by the satellite navigation technology. This work vehicle employs a satellite radio wave sensitivity distribution management system and can effect data exchange with a remotely located management computer CS that functions as a "cloud server". The work vehicle effects work traveling while receiving radio waves including satellite information from a satellite SA at a work site. The work vehicle generates sensitivity reduction event information as information relating to reception sensitivity of the satellite radio wave at the work site and transmits this information to the management computer CS.

Further, as the work vehicle receives from the management computer CS information relating to a traveling route for avoiding sensitivity reduction of the satellite radio wave at each work site, the work vehicle can effects automatic traveling at the work site while avoiding sensitivity reduction of the satellite radio wave as much as possible.

Figure 2:
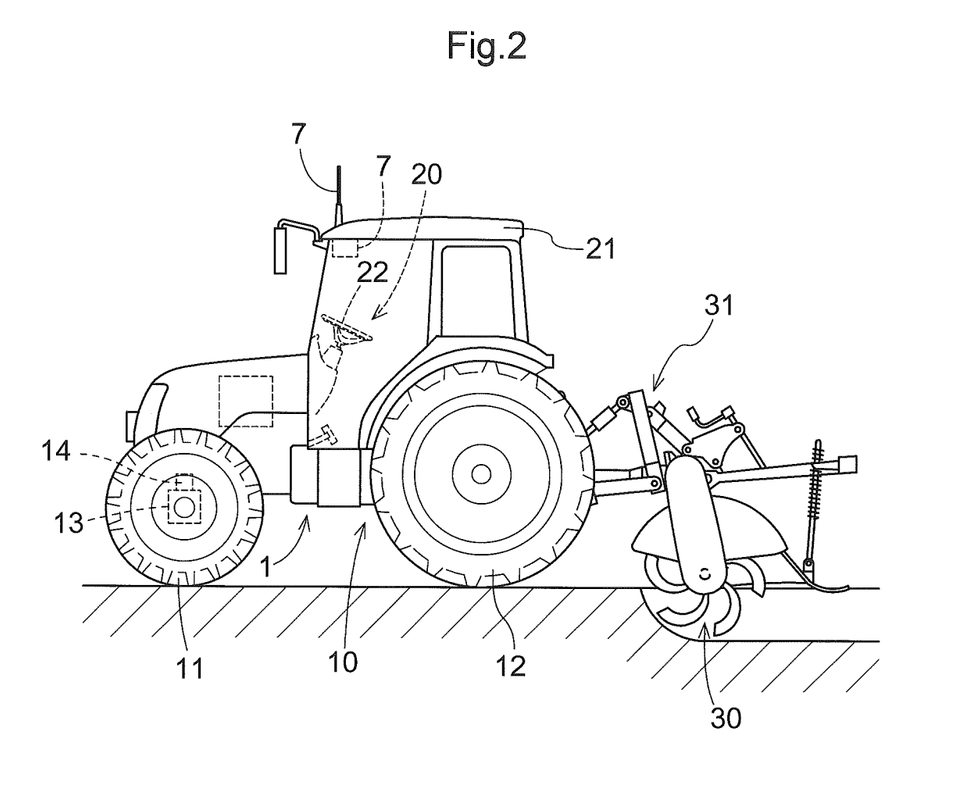
FIG. 2 is a side view of a tractor as an example of the work vehicle.

FIG. 2 shows a tractor for carrying out a farm work in a field as one example of the work vehicle that works at a work site. In this tractor, a driver's compartment 20 is provided at a center of a vehicle body 1 which is supported via front wheels 11 and rear wheels 12. At a rear portion of the vehicle body 1, there is mounted an utility implement 30 which in this case is a rotary cultivator, via a hydraulic lift mechanism 31. The front wheels 11 function as steerable wheels and by changing their steering angle, a traveling direction of the tractor is changed. The steering angle of the front wheels 11 is changed by an operation of a steering mechanism 13. The steering mechanism 13 includes a steering motor 14 for automatic steering. At the time of manual traveling, steering of the front wheels 11 is effected by an operation of a steering wheel 22 disposed in the driver's compartment 20. In a tractor cabin 21, there is provided a satellite positioning module 7 as a positioning module. As a constituent member of the satellite positioning module 7, a satellite antenna for receiving GNSS (Global Navigation Satellite System) signals (including GPS signals) is mounted to a ceiling region of the cabin 21. Meanwhile, this satellite positioning module 7 can include an inertial navigation module incorporating a gyro acceleration sensor or a magnetic direction sensor in order to supplement the satellite navigation. Needless to say, the inertial navigation module can be provided at a location separate from the satellite positioning module 7.

Figure 3:
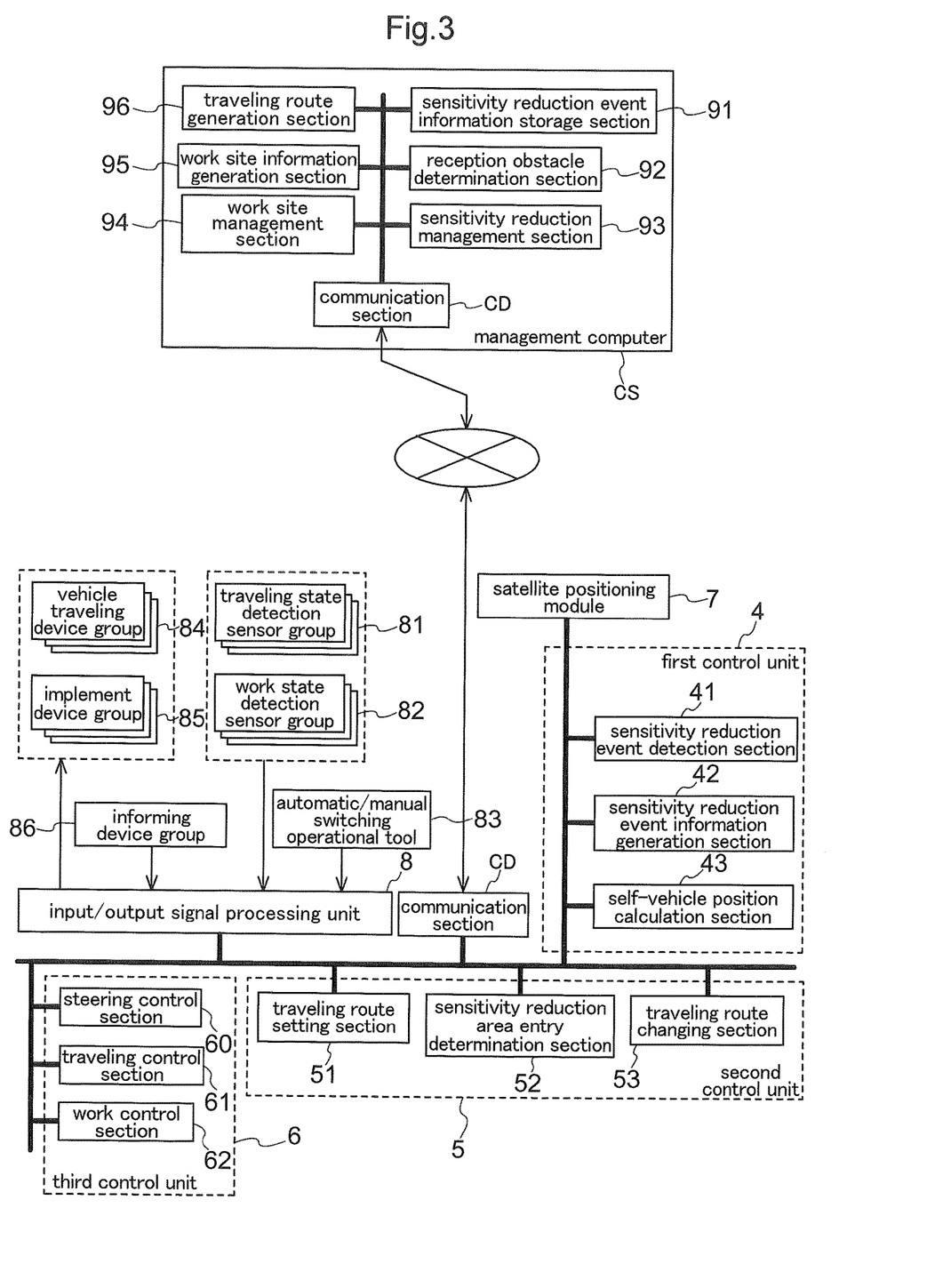
FIG. 3 is a functional block diagram showing control functions relating to the present invention in the satellite radio wave sensitivity distribution management system and the tractor.

FIG. 3 shows a control system built in this tractor. The control system of this embodiment includes a first control unit 4 that handles satellite information sent from a satellite SA via the satellite positioning module 7, a second control unit 5 that handles a traveling route for automatic traveling, a third control unit 6 that effects controlling of the tractor, and an input/output signal processing unit 8 that effects e.g. signal conversion or data conversion on input/output signals. The first control unit 4, the second control unit 5, the third control unit 6 and the input/output signal processing unit 8 are connected to each other via an onboard LAN, data lines, signal lines, etc.

The input/output signal processing unit 8 functioning as an input/output interface can be connected to the data lines, signal lines, and the onboard LAN. Input device groups such as a traveling state detection sensor group 81, a work state detection sensor group 82, an automatic/manual switching operational tool 83, etc. are connected to the input/output signal processing unit 8. Further, output device groups such as a vehicle traveling device group 84, an implement device group 85, an informing device group 86, etc. are connected to the input/output signal processing unit 8. The vehicle traveling device group 84 includes a steering motor 14 of a steering mechanism 13, engine controlling devices, speed changing operational devices, etc. The implement device group 85 includes a power transmission clutch of the cultivator constituting the utility implement 30, a lift cylinder of the lift mechanism 31, and so on. The informing device group 86 includes instruments, a buzzer, lamps, and a liquid crystal display also. Further, to the input/output signal processing unit 8, there are also connected such switches or buttons as the traveling state detection sensor group 81, the work state detection sensor group 82, the automatic/manual switching operational tool 83, and so on.

A communication section CD effects data input/output to/from the outside via a wireless communication network or a wired communication network.

This communication section CD includes a communication module which effects also data input/output to/from the outside via a storage medium such as a USB memory.

The satellite positioning module 7 that receives the satellite information from the satellite SA is connected to the first control unit 4 and provides this first control unit 4 with positioning data, satellite positioning data and reception sensitivity. The first control unit 4 includes a sensitivity reduction event detection section 41, a sensitivity reduction event information generation section 42, and a self-vehicle position calculation section 43. The self-vehicle position calculation section 43 calculates position coordinates of the vehicle body 1 based on the positioning data from the satellite positioning module 7.

The sensitivity reduction event detection section 41 detects occurrence of a sensitivity reduction event which is abnormal reduction in the reception sensitivity of radio waves from the satellite SA. The satellite positioning module 7 is constantly capable of receiving radio waves from four or more satellites SA. In this, the satellite positioning module 7 provides the reception sensitivity from each satellite SA to the sensitivity reduction event detection section 41.

As one exemplary method of detecting the abnormal reduction in the reception sensitivity, the sensitivity reduction event detection section 41 compares the reception sensitivity of each satellite SA provided from the satellite positioning module 7 with a predetermined threshold value and detects occurrence of a sensitivity reduction event if the reception sensitivity falls below the predetermined threshold value. The sensitivity reduction event information generation section 42 generates sensitivity reduction event information in response to detection of sensitivity reduction event by the sensitivity reduction event detection section 41. This sensitivity reduction event information includes an occurrence location of the sensitivity reduction event, an occurrence time of the sensitivity reduction event, and also satellite identification data that identifies a satellite SA as the subject responsible for the sensitivity reduction event. As the position coordinates of the occurrence location, the position coordinates (latitude, longitude) of the vehicle body 1 calculated by the self-vehicle position calculation section 43 are employed. The satellite identification data for identifying the satellite SA includes a satellite ID, an elevation angle, an azimuth angle thereof, etc.

The sensitivity reduction event information generated at the sensitivity reduction event information generation section 42 will be provided to the management computer CS by an online processing (in the case of wireless communication network) or a butch processing (in the case of a storage medium) via the communication section CD.

The second control unit 5 includes a traveling route setting section 51, a sensitivity reduction area entry determination section 52, and a traveling route changing section 53. The traveling route setting section 51 reads out a target traveling route as a target of automatic traveling from among traveling routes downloaded from the outside and loads it into a memory. Alternatively, instead of downloading traveling routes, the traveling routes can be generated within the control system onboard this tractor.

In the instant embodiment, the traveling route for a field to be worked is generated on the side of the management computer CS and downloaded from this management computer CS. Then, the downloaded traveling route is provided to the traveling route setting section 51. This traveling route, as will be explained in greater details below, is added with a sensitivity reduction area and a sensitivity reduction time zone, so that from this traveling route, an area in which sensitivity reduction occurs at a predetermined time (time of day) can be read out. For instance, in case the traveling route is divided into many traveling route segments, information such as a traveling route segment at which sensitivity reduction is to occur at a certain time zone, a different traveling route segment at which sensitivity reduction is to occur at the next time zone, etc. can be read from this traveling route. Based on these information, the sensitivity reduction area entry determination section 52 determines whether or not the tractor is to enter such area where the sensitivity reduction is to occur. If the possibility of entry of the tractor into such sensitivity reduction area is confirmed, then, control will be executed based on a mode preset from either a standby mode and a route changing mode. In the standby mode, the tractor will be caused to make a stop at an appropriate location until exit, with lapse of time, of the entry area of the tractor from the sensitivity reduction time zone. On the other hand, in the route changing mode, the traveling route changing section 53 searches for a traveling route segment that extends to an area where sensitivity reduction is not to occur in that time zone and generates an emergency exit traveling route for moving the tractor to the searched traveling route segment. Then, via this emergency exit traveling route, the tractor will move to the traveling route segment having no possibility of sensitivity reduction and continue its automatic traveling.

The third control unit 6 includes, as control function sections for the tractor to effect automatic work traveling, a steering control section 60, a traveling control section 61 and a work control section 62.

The steering control section 60 has an automatic steering control mode and a manual steering control mode. When the automatic steering control mode is selected, then, the steering control section 60 outputs an operation control signal to the steering motor 14 of the steering mechanism 13 so that the vehicle body 1 will travel along the target traveling route, based on this target traveling route and its self-vehicle position. Whereas, when the manual steering control mode is selected, the steering control section 60 outputs an operation control signal to the steering motor 14 based on a driver's operation of the steering wheel 22.

The traveling control section 61 too has an automatic traveling control mode and a manual traveling control mode. When the automatic traveling control mode is selected, the traveling control section 61 will provide control signals to the vehicle traveling device group 84 based on preset automatic traveling parameters, thus causing the vehicle body 1 to travel at an engine rotational speed and a vehicle speed which are specified by the automatic traveling parameters. Whereas, when the manual traveling control mode is selected, control signals will be provided to the vehicle traveling device group 84 based on driver's operations on an accelerator lever or a speed changer lever, etc. Further, the work control section 62 too has an automatic work control mode and a manual work control mode. When the automatic work control mode is selected, signals will be provided to the implement device group 85 based on the automatic work parameters, thus realizing maintenance of posture of the utility implement 30 and elevating/lowering of the utility implement 30 specified by the automatic work parameters. Whereas, when the manual work control mode is selected, signals will be given to the implement device group 85 based on driver's operations on implement operational tools.

The automatic/manual switching operational tool 83 is a switch for selecting either the automatic traveling mode as traveling by the automatic steering or the manual steering mode as traveling by manual steering. For instance, if this automatic/manual switching operational tool 83 is operated in the course of traveling under the automatic steering mode, the traveling mode is switched to the manual steering mode. Whereas, if this automatic/manual switching operational tool 83 is operated in the course of traveling under the manual steering mode, the traveling mode is switched to the automatic steering mode.

In this embodiment, sensitivity reduction event information generated by the sensitivity reduction event information generation section 42 is provided to the management computer CS which is installed at e.g. a remotely located management center or the like. As the management computer CS functions as a "cloud server", among many tractors implementing the satellite radio wave sensitivity distribution management system of the present invention, data exchanges between the respective communication sections CD thereof and a communication network such as the internet are possible.

The management computer CS includes a sensitivity reduction event information storage section 91, a reception obstacle determination section 92, a sensitivity reduction management section 93, a work site management section 94, a work site information generation section 96 and a traveling route generation section 96.

The sensitivity reduction event information storage section 91 is configured as a "database" and retrievably stores the sensitivity reduction event information transmitted from the tractor. The reception obstacle determination section 92 determines a reception obstacle (mountain forest, building, etc.) which can be a cause of sensitivity reduction event, based on information such as the position coordinates of the sensitivity reduction location, and an elevation angle and an azimuth angle formed between the sensitivity reduction location and the satellite SA, which are all included in the sensitivity reduction event information. The sensitivity reduction management section 93 calculates a sensitivity reduction area and a sensitivity reduction time zone in which occurrence of a sensitivity reduction event due to reception obstacle is presumed, from the determined reception obstacle and the orbit of the presumed satellite SA and manages these as temporal sensitivity reduction area information.

The work site management section 94 manages information relating to work sites, such as map data indicative of a location and a contour of a work site to be worked by the work vehicle, a kind of work to be effected at the work site and history of work(s) carried out at the work site, etc.

The work site information generation section 95 generates work site information added with satellite radio wave sensitivity distribution, comprised of a sensitivity reduction position and a sensitivity reduction time zone incorporated in the map of the work site. This work site information added with the satellite radio wave sensitivity distribution is temporal map data indicative of shifting/transitional change of sensitivity reduction area which varies according to the time zone. From this temporal map data, a sensitivity reduction area which occurs at a particular time zone can be extracted.

The traveling route generation section 96 generates a traveling route for automatic traveling of the tractor. Reference is made to field information including e.g. the contour of of a work site (a field) as a work subject managed in the work site management section 94 and a traveling route will be generated with using a preinstalled traveling route generation program. In this, the traveling route generation section 96 may generate a traveling route with setting of a work start time, a work end time, and a time of traveling at each traveling route segment constituting the traveling route, taking a sensitivity reduction area and a sensitivity reduction time into consideration, so as not to encounter a sensitivity reduction event.

Figure 4:
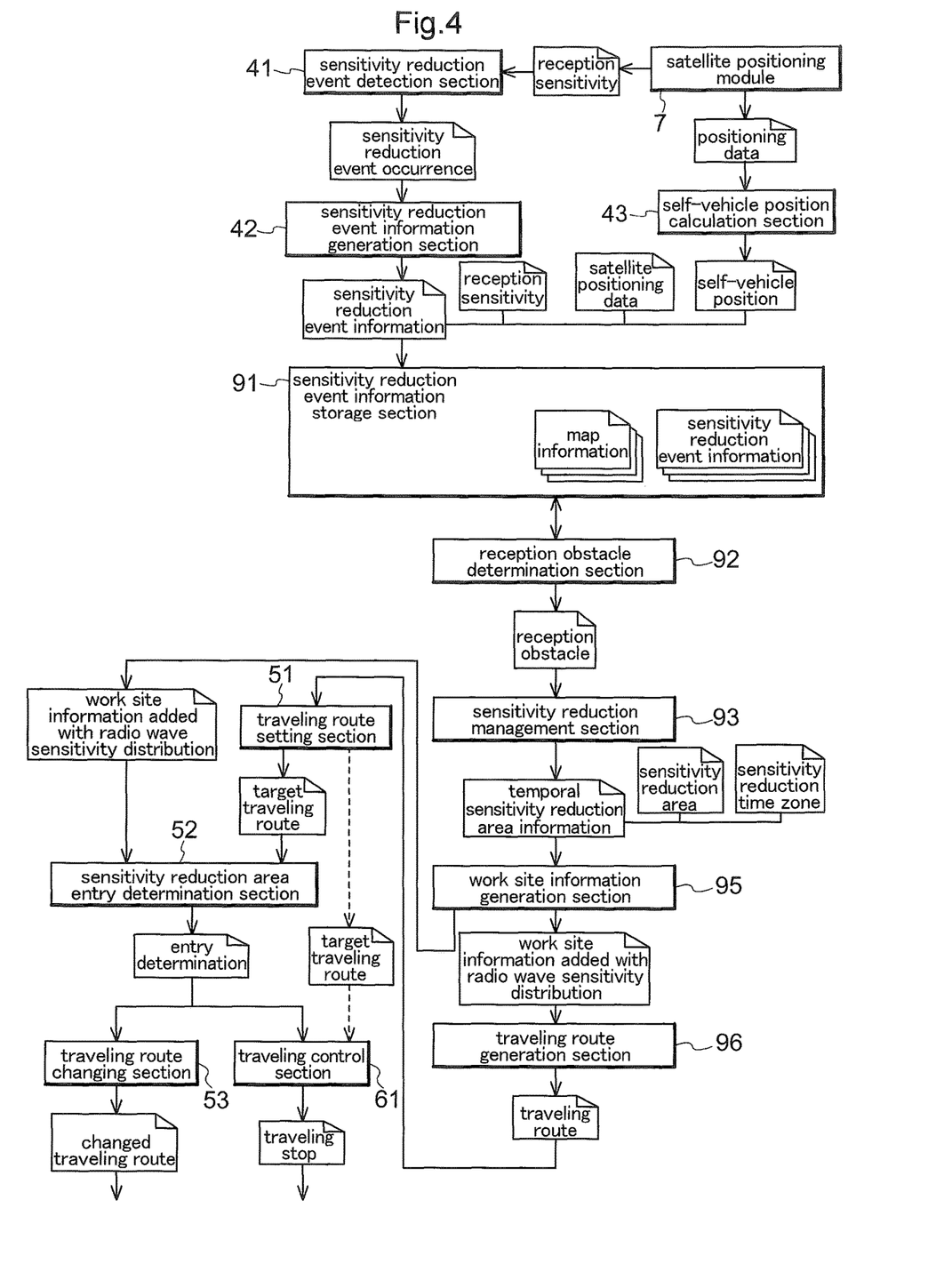
FIG. 4 is an explanatory view illustrating flow of control in the satellite radio wave sensitivity management system.

Next, with reference to FIG. 4, a flow of control in the satellite radio wave sensitivity distribution management system described above will be explained.

The self-vehicle position calculation section 43 calculates a self-vehicle position from positioning data transmitted from the satellite positioning module 7 in the course of traveling of the tractor. Simultaneously, reception sensitivity of the satellite radio waves transmitted from the satellite positioning module 7 will be checked by the sensitivity reduction event detection section 41. The sensitivity reduction event detection section 41 compares the reception sensitivity with the predetermined threshold value and determines it as occurrence of a sensitivity reduction event when the reception sensitivity falls below this threshold value and informs this occurrence of sensitivity reduction event to the sensitivity reduction event information generation section 42. Then, in response to this occurrence of sensitivity reduction event, the sensitivity reduction event information generation section 42 generates sensitivity reduction event information. This sensitivity reduction event information includes reception sensitivity of each satellite, satellite position data (elevation angle, azimuth angle, etc.) a self-vehicle position (sensitivity reduction event occurrence location), a work site ID, etc. The generated sensitivity reduction event information will be sent to the management computer CS by a butch processing or online processing.

The sensitivity reduction event information transmitted from the tractor to the management computer CS will be stored in the sensitivity reduction event information storage section 91 constituted as a database. The management computer CS generates satellite radio wave sensitivity distribution for each work site, based on the sensitivity reduction event information stored in the sensitivity reduction event information storage section 91.

In the generation of the satellite radio wave sensitivity distribution, firstly, a reception obstacle (mountain forest, building) as the cause of the occurrence of the sensitivity reduction will be determined by the reception obstacle determination section 92. This will be obtained based on the sensitivity reduction event occurrence location, and the elevation angle and the azimuth angle of the satellite as the subject of the sensitivity reduction event. Subsequently, the sensitivity reduction management section 93 generates and manages the temporal sensitivity reduction area information due to a reception obstacle of each work site. This temporal sensitivity reduction area information includes sensitivity reduction area for each time (hour) at the work site. Then, based on this temporal sensitivity reduction area information of each work site, the work site information generation section 95 generates work site information added with the radio wave sensitivity distribution of each work site. For example, this work site information added with the radio wave sensitivity distribution is generated in the form of map information indicative of sensitivity reduction area for each day/time. The generated work site information added with the radio wave sensitivity distribution will be stored in the sensitivity reduction event information storage section 91.

Upon determination of a work plan for the work site, the traveling route generation section 96 generates a traveling route for automatic traveling of the tractor. In this, the traveling route generation section 96 retrieves the work site information added with the radio wave sensitivity distribution for this work site and effects generation of the traveling route specified by the traveling time that will not cause reduction in radio wave sensitivity in the course of traveling of the tractor. The generated traveling route will be downloaded in the traveling route setting section 51 of the tractor. On the side of the tractor, the steering control section 60 effects automatic steering such that the vehicle body 1 may travel along the target traveling route set by the traveling route setting section 51.

In the case of the automatic traveling, depending on various situations, traveling along the traveling route in accordance with a planed time schedule may not be possible. For this reason, in the course of the automatic traveling, the sensitivity reduction area entry determination section 52 determines whether or not the vehicle body 1 is to enter a sensitivity reduction area, based on the work site information added with the radio wave sensitivity distribution, the target traveling route and the self-vehicle position. If entry to a sensitivity reduction area or possibility of entry thereto is determined, either an action of stopping the traveling temporally to wait for recovery of the sensitivity or an action of changing to a traveling route along a changed traveling route produced by the traveling route changing section 53 that can guide the tractor to a location of better reception sensitivity will be effected. This selection can be set in advance. But, it may be commanded via a remote controller or the like.

Other Embodiments (1) In the foregoing embodiment, the satellite radio wave sensitivity distribution management system was configured as a cloud service using the management computer CS as a server and using the tractor as a client.

Instead of the above, the satellite radio wave sensitivity distribution management system may be implemented as a standalone-like system of the tractor with mounting the management computer CS on the tractor or configuring the system as a communication terminal computer to be mounted onboard the tractor.

(2) The division of the respective functional sections in the functional block diagram shown in FIG. 3 is only exemplary for the sake of readiness of explanation. Thus, combining the various functional sections or dividing a single function section into a plurality of subsections can be made as desired.

(3) In the foregoing embodiment, a tractor mounting a cultivator device as the utility implement 30 was cited as an example of the work vehicle. However, the present invention is applicable also to a tractor mounting a utility implement 30 other than a cultivator device or even to other agricultural machines such as a combine, a rice planter, etc. or a civil engineering machine, etc.

INDUSTRIAL APPLICABILITY

The present invention is applicable to a work vehicle which effects automatic traveling at a work site by the satellite navigation technology.

DESCRIPTION OF SIGNS

7: satellite positioning module
41: sensitivity reduction event detection section
42: sensitivity reduction event information generation section
43: self-vehicle position calculation section
51: traveling route setting section
52: sensitivity reduction area entry determination section
53: traveling route changing section
60: steering control section
91: sensitivity reduction event information storage section
92: reception obstacle determination section
93: sensitivity reduction management section
94: work site management section
95: work site information generation section
96: traveling route generation section
CD: communication section
CS: management computer
SA: satellite

The invention claimed is:

1. A satellite radio wave sensitivity distribution management system for a work vehicle that travels automatically in a work site by satellite navigation technology, the system comprising:

a satellite positioning module that outputs satellite position data and reception sensitivity based on satellite information from a satellite;
a sensitivity reduction event detection section that detects occurrence of a sensitivity reduction event comprising abnormal reduction of the reception sensitivity;
a sensitivity reduction event information generation section that generates sensitivity reduction event information including an occurrence location of the sensitivity reduction event, an occurrence time of the sensitivity reduction event, and satellite identification data that identifies the satellite as the subject of the sensitivity reduction event;
a sensitivity reduction event information storage section that stores the sensitivity reduction event information retrievably;
a reception obstacle determination section that determines a reception obstacle as the cause of the sensitivity reduction event, based on the sensitivity reduction event information; and
a sensitivity reduction management section that manages a sensitivity reduction area and a sensitivity reduction time zone in which occurrence of the sensitivity reduction event due to the reception obstacle is presumed.

2. The satellite radio wave sensitivity distribution management system of claim 1, wherein there is provided a work site information generation section that generates work site information added with satellite radio wave sensitivity distribution, the work site information being comprised of the sensitivity reduction area and the sensitivity reduction time zone incorporated in a map of the work site.

3. The satellite radio wave sensitivity distribution management system of claim 1, wherein there is provided a traveling route generation section that generates a traveling route for the work vehicle, the traveling route generation section being configured to generate the traveling route so as not to encounter the sensitivity reduction event, with consideration to the sensitivity reduction area and the sensitivity reduction time zone.

4. The satellite radio wave sensitivity distribution management system of claim 3, wherein:
the traveling route is added with the sensitivity reduction area and the sensitivity reduction time zone; and
when possibility of the work vehicle entering the sensitivity reduction area in the sensitivity reduction time zone is confirmed, the work vehicle is caused to wait until exit from the sensitivity reduction time zone.

5. The satellite radio wave sensitivity distribution management system of claim 3, wherein:
the traveling route is added with the sensitivity reduction area and the sensitivity reduction time zone; and
there is provided a traveling route changing section configured to change the traveling route to a route for moving into a location of better reception sensitivity, when possibility of the work vehicle entering the sensitivity reduction area in the sensitivity reduction time zone is confirmed.

6. The satellite radio wave sensitivity distribution management system of claim 1, wherein:
the satellite positioning module, the sensitivity reduction event detection section and the sensitivity reduction event information generation section are provided in the work vehicle;
the sensitivity reduction event information storage section, the reception obstacle determination section and the sensitivity reduction management section are provided in a management computer remote from the work site; and the sensitivity reduction event information is forwarded from the work vehicle to the management computer.

7. A satellite radio wave sensitivity distribution management method for a work vehicle that travels automatically in a work site by satellite navigation technology, the method comprising:

outputting satellite position data and reception sensitivity based on satellite information from a satellite;

detecting occurrence of a sensitivity reduction event comprising abnormal reduction of the reception sensitivity;

generating sensitivity reduction event information including an occurrence location of the sensitivity reduction event, an occurrence time of the sensitivity reduction event, and satellite identification data that identifies the satellite as the subject of the sensitivity reduction event;

storing the sensitivity reduction event information retrievably;

determining a reception obstacle as a cause of the sensitivity reduction event, based on the sensitivity reduction event information; and managing a sensitivity reduction area and a sensitivity reduction time zone in which occurrence of the sensitivity reduction event due to the reception obstacle is presumed.

8. The satellite radio wave sensitivity distribution management method of claim 7, further comprising generating work site information added with satellite radio wave sensitivity distribution, the work site information being comprised of the sensitivity reduction area and the sensitivity reduction time zone incorporated in a map of the work site.

9. The satellite radio wave sensitivity distribution management method of claim 7, further comprising generating a traveling route for the work vehicle, the traveling route being generated so as not to encounter the sensitivity reduction event, with consideration to the sensitivity reduction area and the sensitivity reduction time zone.

10. The satellite radio wave sensitivity distribution management method of claim 9, wherein:

the traveling route is added with the sensitivity reduction area and the sensitivity reduction time zone; and when possibility of the work vehicle entering the sensitivity reduction area in the sensitivity reduction time zone is confirmed, the work vehicle is caused to wait until exit from the sensitivity reduction time zone.

11. The satellite radio wave sensitivity distribution management method of claim 9, wherein:

the traveling route is added with the sensitivity reduction area and the sensitivity reduction time zone; and the method further comprises changing the traveling route to a route for moving into a location of better reception sensitivity, when possibility of the work vehicle entering the sensitivity reduction area in the sensitivity reduction time zone is confirmed.

* * * * *